United States Patent [19]
Collins

[11] Patent Number: 5,570,896
[45] Date of Patent: Nov. 5, 1996

[54] BICYCLE REAR WHEEL SUSPENSION

[76] Inventor: Benjamin C. Collins, High Mountain View, High Newton, Grange-Over-Sands, Cumbria, England, LA11 6JQ

[21] Appl. No.: 170,212
[22] PCT Filed: Jun. 29, 1992
[86] PCT No.: PCT/GB92/01176
§ 371 Date: Dec. 28, 1993
§ 102(e) Date: Dec. 28, 1993
[87] PCT Pub. No.: WO93/00252
PCT Pub. Date: Jan. 7, 1993

[30] Foreign Application Priority Data

Jun. 28, 1991 [GB] United Kingdom ............... 9113964

[51] Int. Cl.$^6$ .................................................. B62K 25/10
[52] U.S. Cl. .................. 280/284; 267/249; 267/293; 267/286
[58] Field of Search ................. 280/284, 283, 280/288, 276, 281.1; 267/132, 201, 249, 293, 64.27, 140.2, 286, 167

[56] References Cited

U.S. PATENT DOCUMENTS

| 644,787 | 3/1900 | Williams | 280/284 |
| 4,022,485 | 5/1977 | Cox | 280/287 |
| 4,406,504 | 9/1983 | Coenen et al. | 384/545 |

FOREIGN PATENT DOCUMENTS

| 559615 | 9/1923 | France | 280/284 |
| 767510 | 7/1934 | France . | |
| 933079 | 4/1948 | France | 280/284 |
| 992417 | 10/1951 | France . | |
| 90233 | 3/1896 | Germany . | |
| 9017423.2 | 12/1990 | Germany . | |
| 437325 | 12/1947 | Italy | 280/284 |
| 660574 | 5/1987 | Switzerland . | |
| 116153 | 6/1918 | United Kingdom | 280/284 |
| 1205286 | 9/1970 | United Kingdom . | |

*Primary Examiner*—Eric D. Culbreth
*Assistant Examiner*—F. Zeender
*Attorney, Agent, or Firm*—Larson and Taylor

[57] ABSTRACT

A bicycle rear wheel suspension which pivots a rear frame (10) behind the bottom bracket shell (5). The overall pivot width is greater than that of the bottom bracket shell (5), this ensures high torsional control and simplifies manufacture. At the junction of the seat stays (9) there projects a suspension housing (16) which sleeves axially or near axially over the stay runner (17). Both the suspension housing (16) and stay runner (17) feature flat sides to which bearing surfaces (19) are affixed. Between the bearing surfaces (19) there are needle roller bearing groups (20). One or both of the bearing surfaces (19) have deformable backs (21). The stepload slot (32) exerts a stepload force on the stepload pin (23) and the suspension such that only a bump loading force above that threshold stepload force would produce suspension movement. A hollow shock absorber (26) surrounds both the suspension housing (16) and stay runner (17). When a shock loading is received at the rear wheel (11), the rear frame (10) is moved arcuately about its pivot (12) with the suspension housing and mounting boss (27) acting to deform the shock absorber (26) and sleeving the stay runner (17).

8 Claims, 3 Drawing Sheets

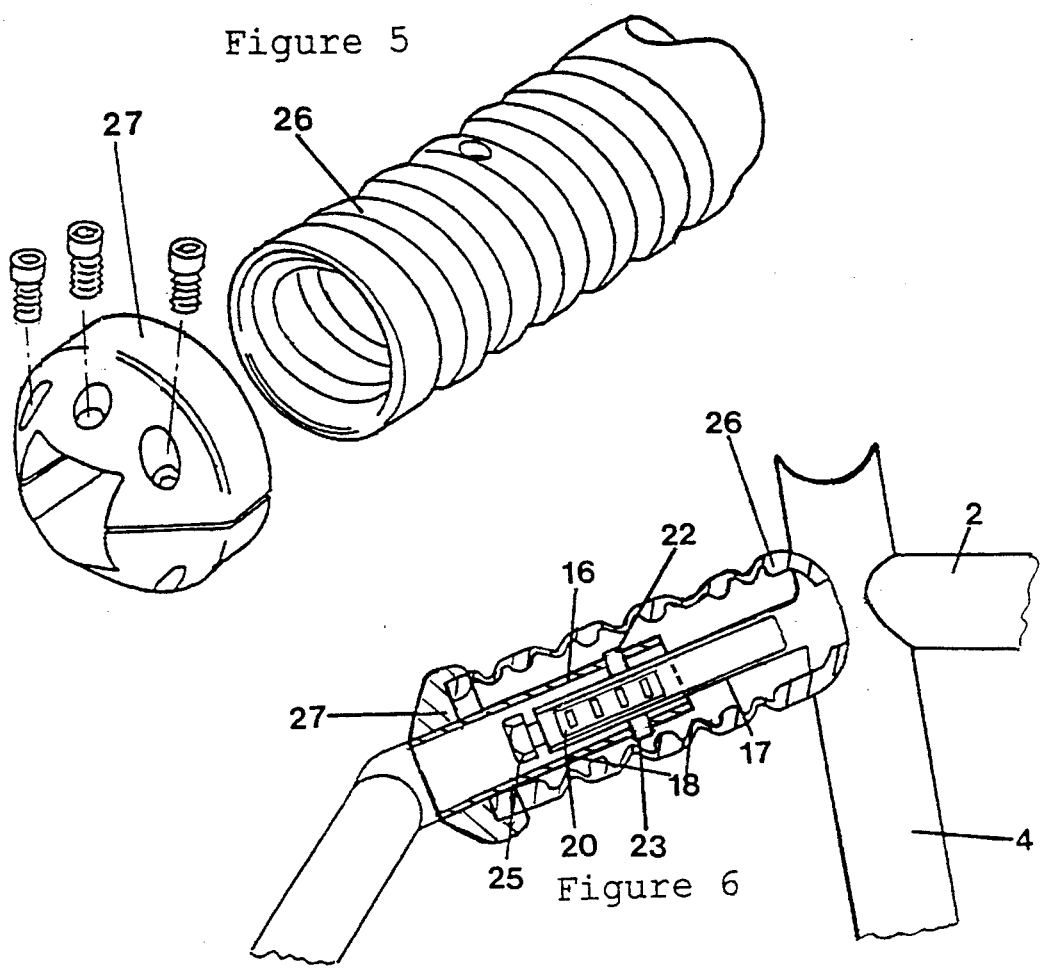
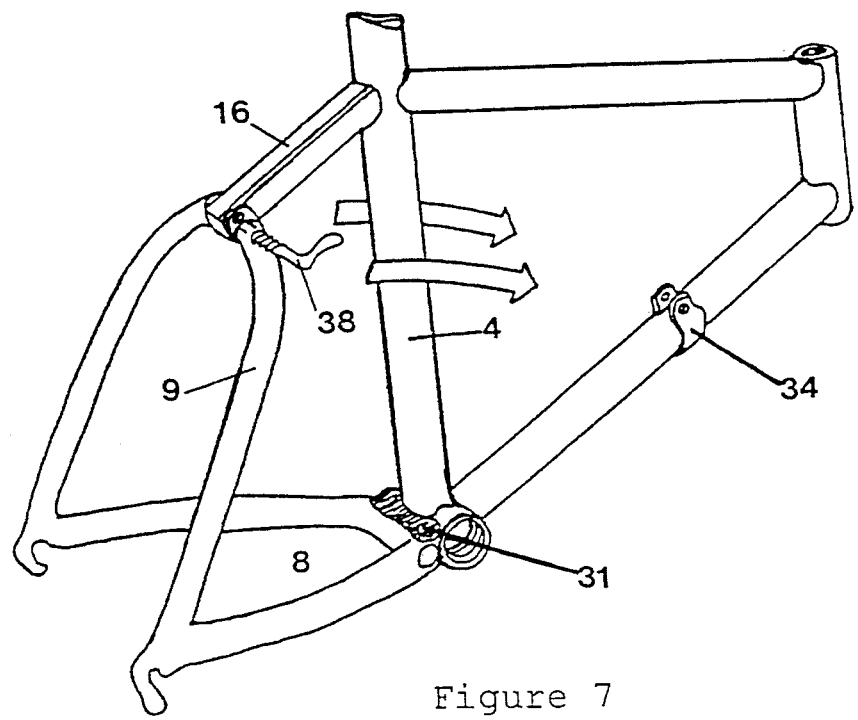

BICYCLE REAR WHEEL SUSPENSION

This invention relates to suspension systems for use on bicycles, motor cycles and other modes of transport utilising wheels or ski's.

Suspension on a bicycle would provide many benefits to the performance of a bicycle (too numerous to discuss), however such systems currently available are either over simple as to be ineffective in some aspects of performance or too complicated such to increase the bicycle weight and cost.

There are five principle objectives of this invention.

The first is to provide a lightweight and simple rear wheel suspension system, achieved by using a single pivot axis, this will be referred to as a "unipivot".

The second is to incorporate a stepload system in order to prevent articulation upon component pedalling loads.

The third is to ensure the arcuate movement is free to move in only two planes, this will be referred to as being "torsion locked".

The fourth is to achieve these requirements in a compact package in a manner that is compatible with most bicycle frames.

The fifth is to offer an option of frame size reduction for transport, making use of the pivot which forms part of the suspension.

A specific embodiment of the invention will now be described by way of example with reference to the accompanying drawings in which:

FIG. 5 is a perspective view of the shock absorber and clamp.

FIG. 6 is a centre-sectioned side elevation of the shock absorbing system and surrounding frame components.

FIG. 7 is a perspective view of a complete frame and utilising the removable stay clamp.

Figure 1:
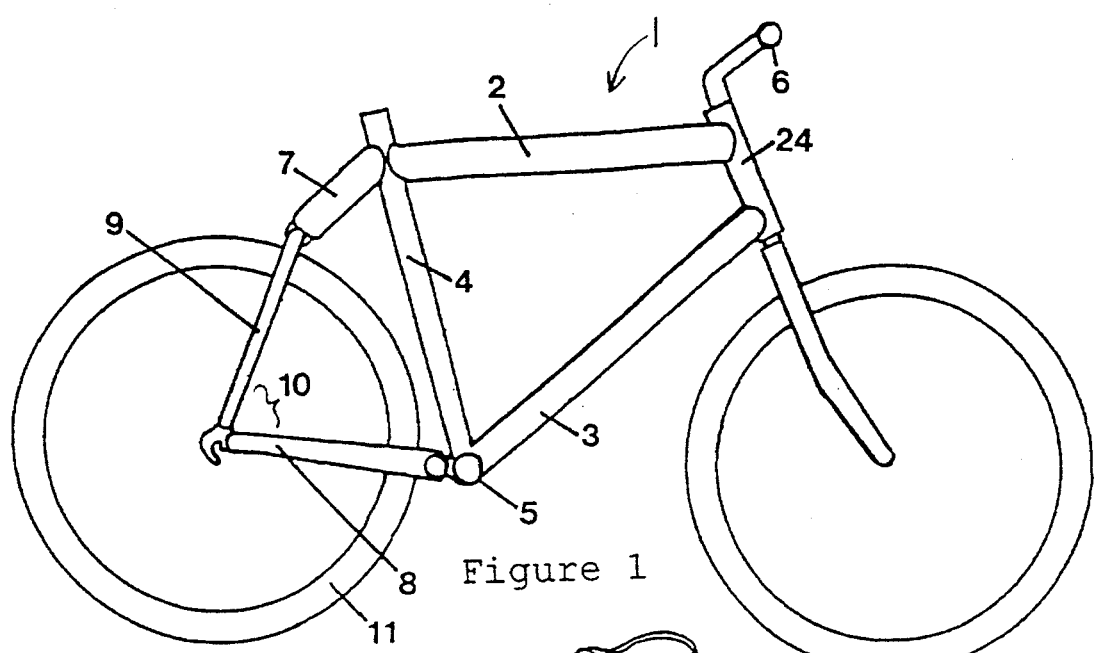
FIG. 1 is a side elevation of a bicycle frame including the rear suspension components.
Figure 2:
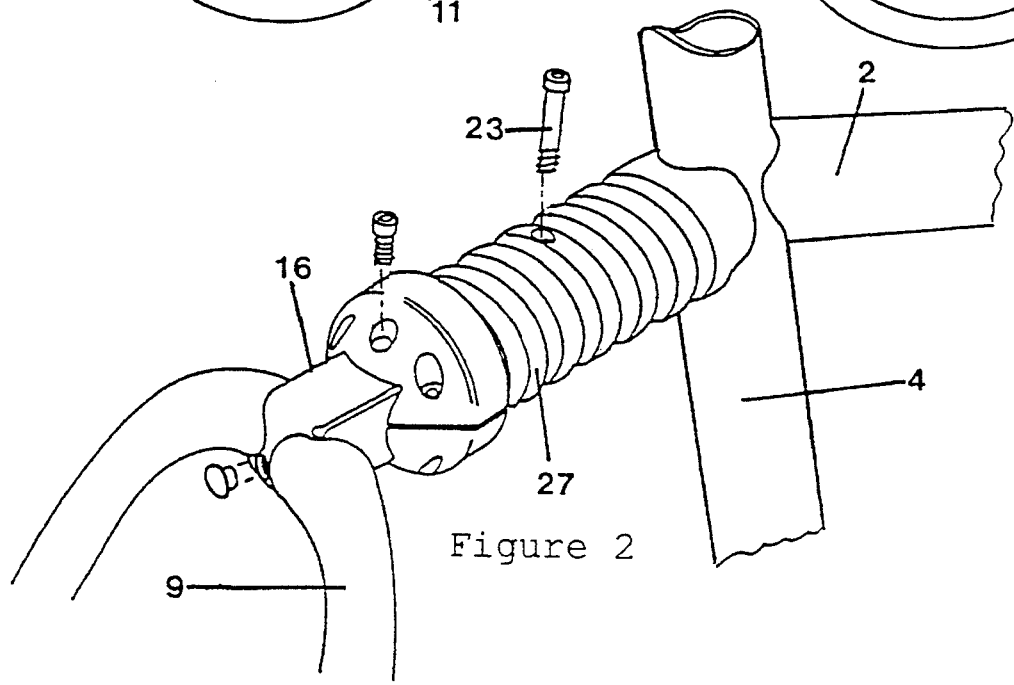
FIG. 2 is a perspective view of the suspension unit (not including pivot) and frame surrounding elements.

In FIG. 1 there is illustrated a bicycle mainframe 1 which includes a top tube 2, down tube 3, seat tube 4, bottom bracket shell 5 and according to the present invention a suspension unit 7.

Also illustrated is a bicycle rear frame 10 comprising a pair of seat stays 9 and chain stays 8 respectively and a rear wheel 11.

Also illustrated are other well known bicycle components such as handlebars 6 and a head tube 24.

Said rear frame 10 is pivotally attached directly behind said bottom bracket shell 5.

Figure 9:
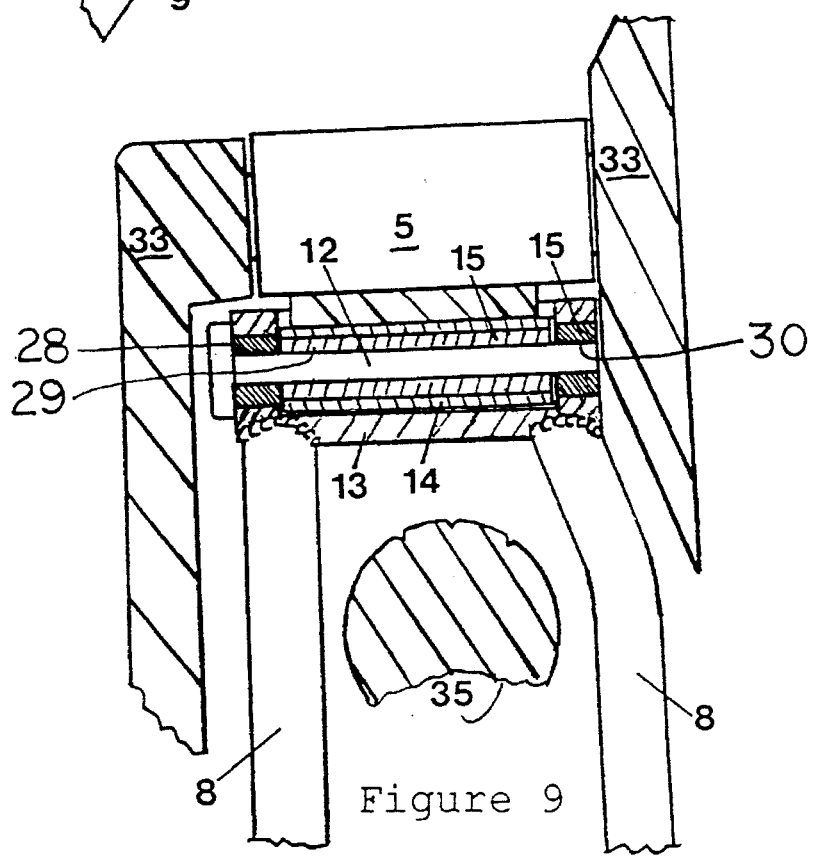
FIG. 9 is centre sectioned elevation of the pivot system.
Figure 10:
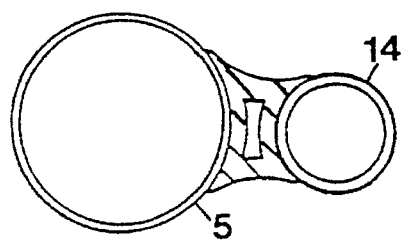
FIG. 10 is a side elevation of the bottom bracket shell with pivot system attached.

In FIG. 9 there is a pivot system comprising rear frame axle 13 and mainframe axle 14. Both these axles have inner bearing surfaces 15 which mate to a pivot pin 12. The overall pivot width is greater than that of the bottom bracket shell 5 but not too great as to interfere with the pedalling action of transmission components 33 of the bicycle when ridden.

In FIG. 6 at the junction of the seat stays 9 there projects a suspension housing 16 which sleeves axially or near axially over the stay runner 17.

Both the suspension housing 16 and stay runner 17 feature flat sides 18 to which bearing surfaces 19 are affixed.

Figure 3:
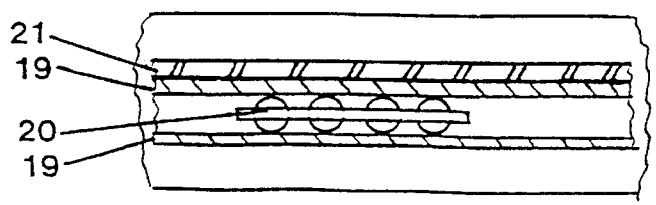
FIG. 3 is a side elevation of the suspended beating arrangement.
Figure 4:
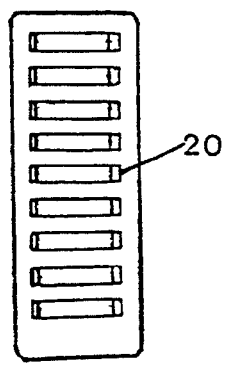
FIG. 4 is a front elevation of a linear roller beating.
Figure 8:
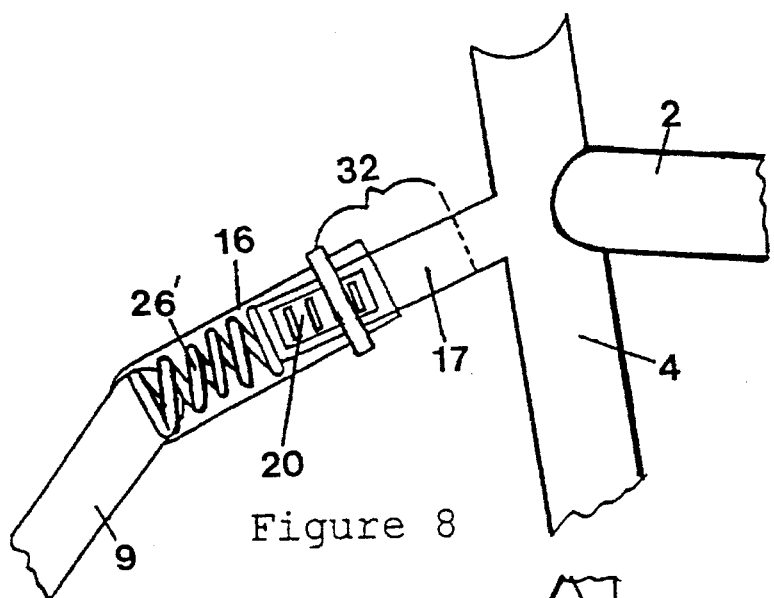
FIG. 8 is a side elevation of an alternative shock absorber position.

Between the bearing surfaces 19 there are needle roller bearing groups 20 as shown in FIG. 3.

The bearing surfaces may feature deformable backing 21 as shown in FIG. 3. This allows the bearing surface 19 to provide a controlled level of movement, this facilitates manufacture and tolerancing and guarantees proper torsional control.

The suspension housing 16 is holed on both sides 22, one hole being threaded, this permits entry within the housing of a stepload bolt 23. The stay runner 17 has a vertical, axial stepload slot 32 running part of its length.

Also a stepload adjustment bolt 25 is located in the open end of the stay runner 17, threading axially though a tapped hole until reaching the stepload slot 32

A hollow shock absorber 26 surrounds both the suspension housing 16 and stay runner 17, its top end mates against the seat tube 4 and its lower end mates against the seat stays 9 or part way down the suspension housing 16 to a mounting boss 27 as shown. This mounting boss 27 can be moved up or down the suspension housing 16 to increase or decrease respectively the preload of the shock absorber 26. This preload level will determine the spring rate of the arrangement.

When a shock loading is received at the rear wheel 11, the rear frame 10 is moved arcuately about its pivot pin 12 with the suspension housing 16 acting to deform the shock absorber 26 and sleeving the stay runner 17.

The shock absorber 26 attempts to retrieve the stay runner 17 from within the suspension housing 16 but is prevented from doing so by the stepload bolt 23 which is trapped within the stepload slot 32 of the stay runner 17.

The stepload bolt 23, attached to the suspension housing 16 is in place through the stepload slot 32, a stepload adjustment bolt 25 can be used to decrease the length of the stepload slot and thus increase the level of stepload on the suspension system.

A further refinement of the design can be seen in FIG. 7 where at the end of each seat stay 9 there are components to create a rear frame removal clamp 38 which permits attachment and detachment of the top of the seat stays 9 to/from the suspension housing 16/stay runner 17 (depending on their configuration). On detachment, components of seat stay removal clamp 33 may remain attached to the top of each seat stay 9. The rear frame 10 then moves arcuately about its pivot 12 and manoeuvres the top of the seat stays 9 to mate to a junction 34 on the down tube 3, where it can be affixed, thus producing a reduction in frame size when required. The said pivot pin 12 about which the rear frame moves arcuately is located above or adjacent to the bottom bracket shell 5. The pivot is of a special type described thus:

A removable pivot pin 12 which passes through the left side of a pivot eye bush 28, then through a pivot axle bush 29 and then through the right side of the pivot eye bush 30. The pair of pivot eyes (28 and 30) and pivot axle 29 are attached either; to the rear frame axle 13 and above or near the bottom bracket shell 5 respectively, or attached above or near the bottom bracket shell 5 and to the rear frame axle 13 respectively.

The rear frame axle 13 is attached to the rear frame 10 in such a way as to achieve maximum width of the pivot components. The rear frame axle 13 extends beyond the normal width of the bottom bracket shell 5 but is modified to just avoid contact with transmission components 33. This provides better tire 35 to rear frame 10 clearance and permits the use of shorter chain stays 8, but most importantly achieves greater torsional control of the suspension system. Shown in FIG. 7 is a din cover 31 which is made from a deformable and curable material. This allows the frame builder to create a dirt cover 31 to exactly fit and protect the pivot system, whatever the exact frame construction configuration.

I claim:

1. A rear wheel suspension system for a bicycle, where the bicycle includes a bicycle frame comprising a main frame portion and a rear frame portion having a rear frame pivot in the region of a bottom bracket shell, wherein the rear wheel suspension system comprises:

a shock absorbing system between a seat member of the main frame portion and the rear frame portion including (a) an inner member mounted on one of the main frame portion and the rear frame portion and an outer member about said inner member whereby said inner member is generally axially slidable in said outer member which is mounted on the other of the rear frame portion and the main frame portion, whereby the rear frame portion moves arcuately about said rear frame pivot and the inner and outer members move substantially axially over one another, when a shock loading is received on the rear frame portion and the seat member, the inner and outer members have two bearing surfaces on their external and internal opposed sides respectively, these bearing surfaces allowing substantially axial movement of the inner member within the outer member but precluding twisting of the inner and outer member and the rear frame portion to which one of the inner and outer members is attached, thereby providing a torsion lock on the inner and outer members and therefore a torsion lock on both the pivoting rear frame portion and suspension system;

(b) a shock absorber mounted between said seat member and said rear frame portion;

(c) a stepload system wherein a stepload pin is located and fixed through the outer member, a stepload slot in said inner member in which said step pin moves whereby the limit of the inner member's slot prevents the stepload pin and subsequently the outer member and the rear frame portion from fully returning to a position where the shock absorber is unloaded, which results in a steploading of the shock absorber and suspension system such that only a shock loading on the rear frame portion greater than the steploading permits suspension system articulation; and (d) an axial adjusting screw of the length of said stepload slot incorporated in the inner member, whereby movement of the adjusting screw decreases and increases the length of the stepload slot thereby respectively increasing and decreasing the steploading on the shock absorber and suspension system.

2. A bicycle rear wheel suspension system as claimed in claim 1 where the shock absorber is located within the outer member.

3. A bicycle rear wheel suspension system as claimed in claim 1 and further including a rear frame removal clamp which permits attachment and detachment of a top of two seat stays of said rear frame portion to the one of the inner and outer members attached to said rear frame portion such that, once detached, components of the rear frame removal clamp remain attached to the top of each said seat stay, the rear frame portion moves arcuately about a suspension pivot, maneuvering the top of the stays to either side of a seat tube of the main frame portion to mate to a junction on a down tube of the main frame portion, where the rear frame portion can be secured, thus producing a reduction in the bicycle frame size when required.

4. A bicycle rear wheel suspension system as claimed in claim 1 and further including pivot system dirt cover which is made from a deformable and curable material, which exactly protects the rear frame pivot from dirt particulate intrusion.

5. A bicycle rear wheel suspension system as claimed in claim 1 including a suspension pivot which is attached to the bottom bracket shell by means of a spacer which has a profile with two adjacent concave faces, one of which mates to the bottom bracket shell and the other to a suspension pivot axle.

6. A bicycle rear wheel suspension system as claimed in claim 1 including a bearing arrangement between the outer member and inner member utilizing bearings running on flat surfaces.

7. A bicycle rear wheel suspension system as claimed in claim 1 including a bearing arrangement between the outer member and inner member utilizing bearings running on flat surfaces which are backed by a deformable layer, said deformable layer having enlarged edges which are used to retain the bearings.

8. A bicycle rear wheel suspension system as claimed in claim 1 where the shock absorber surrounds the inner and outer members.

\* \* \* \* \*